Feb. 3, 1970
C. J. BARECKI ET AL
3,493,211
SHOCK-ABSORBING SEAT
Filed Feb. 26, 1968
3 Sheets-Sheet 1
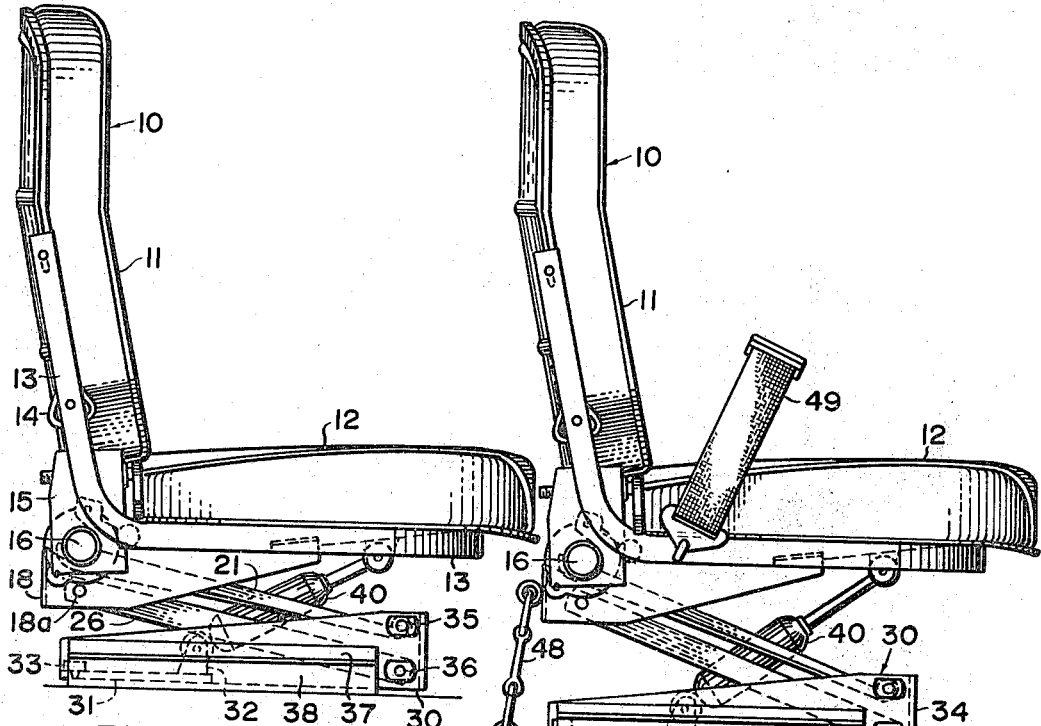
FIG. 1
FIG. 3
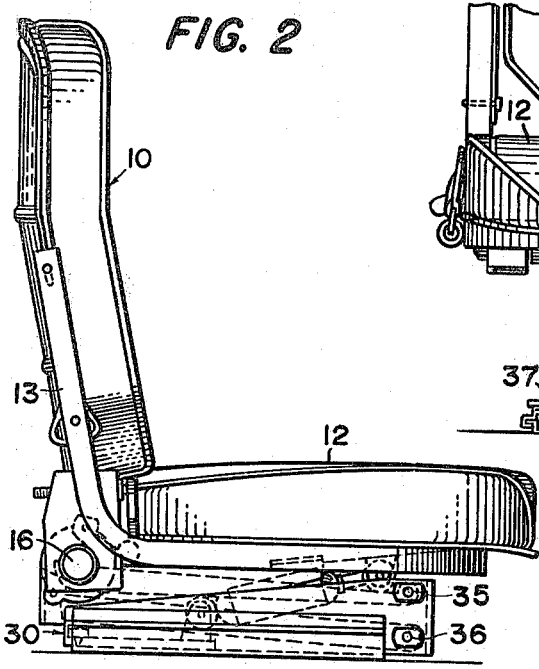
FIG. 2
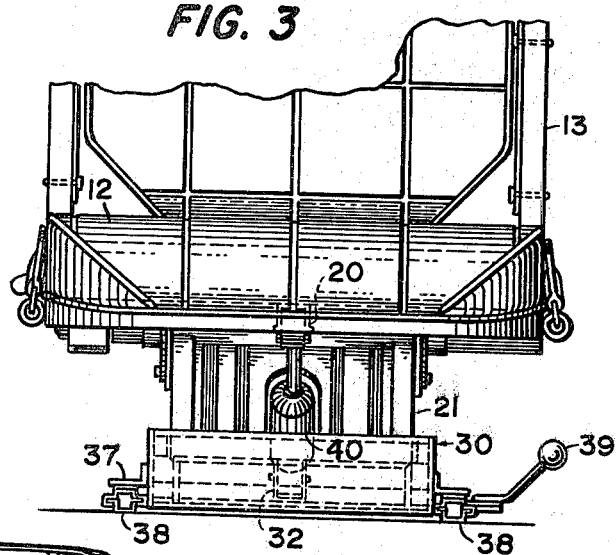
FIG. 4
INVENTORS
Chester J. Barecki
Thomas J. McKernan
BY Dawson, Tilton, Fallon, and Lungmus
ATTORNEYS

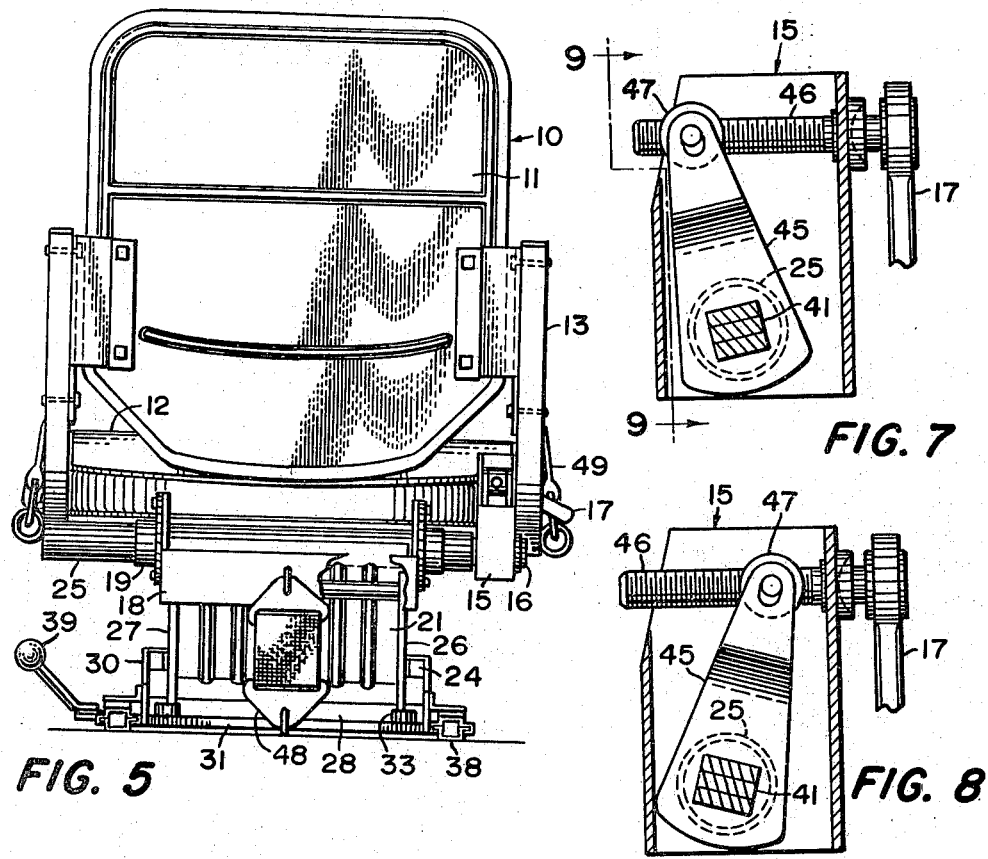

Feb. 3, 1970

C. J. BARECKI ET AL 3,493,211

SHOCK-ABSORBING SEAT

Filed Feb. 26, 1968

INVENTORS
Chester J. Barecki
Thomas J. McKernan
BY Dawson, Tilton, Fallon,
and Bungmus.
ATTORNEYS 3,493,211
Patented Feb. 3, 1970

3,493,211
SHOCK-ABSORBING SEAT
Chester J. Barecki and Thomas J. McKernan, Grand Rapids, Mich., assignors to American Seating Company, Grand Rapids, Mich., a corporation of Michigan
Filed Feb. 26, 1968, Ser. No. 708,144
Int. Cl. B60n 1/00
U.S. Cl. 248—399         3 Claims

ABSTRACT OF THE DISCLOSURE

A driver's seat supported by a torque tube containing a torsion bar and by another bar in parallel is provided also with a shock absorber to furnish a floating and relatively level ride for the driver even though the truck cab may bounce up and down during the drive.

SUMMARY

Figure 12:
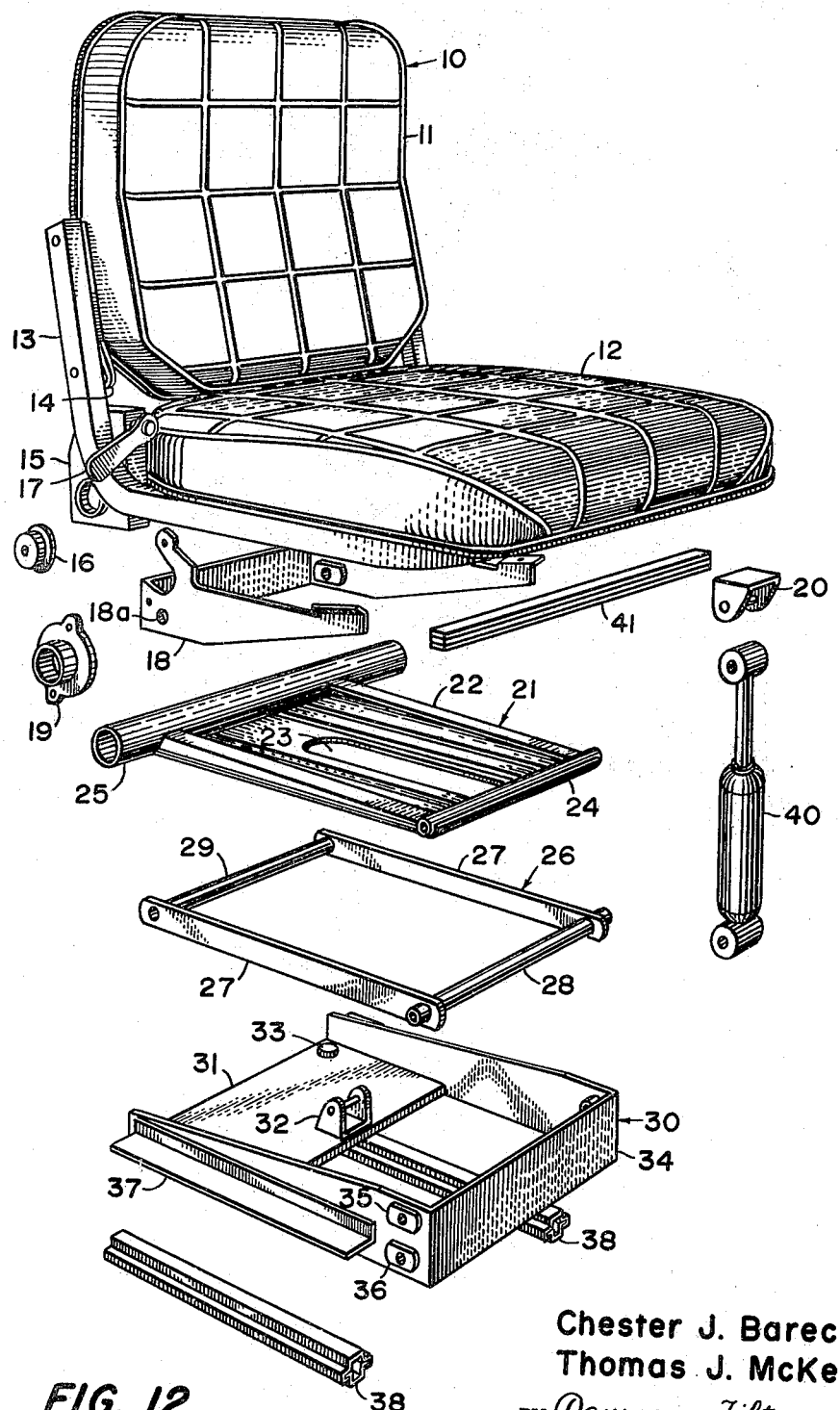

In combination with a seat and a base spaced from the seat, inclined parallel bars are provided for connecting the base and seat, and torsion spring means associated with one of the bars is employed for normally suspending the seat and its occupant in an intermediate position, while a hydraulic shock absorber is also interposed between the base and seat and preferably in a direction opposed to that of the parallel bars whereby the driver is supported in a floating and relatively level position irrespective of the rising and falling of the truck cab.

DRAWINGS

In the accompanying drawings, FIG. 1 is a side view in elevation of a driver's seat in which torsion spring means are adjusted to support the driver in an intermediate position; FIG. 2, a view similar to FIG. 1 but showing the seat in lowered position; FIG. 3, a view similar to FIG. 1 but showing the seat in a high or rebound position; FIG. 4, a broken front view of the structure as shown in FIG. 3; FIG. 5, a rear view of the structure shown in FIG. 3 exposing the under structure; FIG. 6, a rear view of the structure shown in FIG. 2 (lower position); FIG. 7, a broken enlarged detail sectional view showing the torsion bar adjusting mechanism with the torsion spring in non-stressed position, said section being taken as indicated at line 7—7 of FIG. 9; FIG. 8, a view similar to FIG. 7 but showing the torsion spring in maximum static windup position and adjusted for a heavy driver; FIG. 9, a broken rear view of the torsion bar adjusting mechanism with the torsion bar housed in a torque tube having a pivot bearing on the right, the view being taken as indicated at line 9—9 of FIG. 7; FIG. 10, a broken detail sectional view of the torque tube and torsion bar end, the section being taken as indicated at line 10—10 of FIG. 11; FIG. 11, a transverse sectional view, the section being taken as indicated at line 11—11 of FIG. 10; and FIG. 12, an exploded view of the seat structure with the main parts shown in spaced relation.

DETAILED DESCRIPTION

A driver's seat structure is constructed so as to contract and expand rapidly and thus absorb the shocks of a rough road while suspending the driver in a floating and relatively level ride irrespective of the up-and-down movement of the truck cab. In the structure, parallel bar members are employed between the base and the seat in combination with torsion spring means for normally supporting the seat in an intermediate position when occupied by the driver. A hydraulic shock absorber is employed in combination for suspending the driver in the floating and generally level positions.

In FIG. 1, the driver's seat is shown in the desired halfway position between the high and low positions, the torsion spring means being adjusted for the individual driver to support him in the said intermediate position. In FIG. 2, the seat is shown in the low position as when the truck cab bounces up. Actually, in the first step of the jolt when the truck cab bounces up, the seat absorbs this upward shock by compressing itself and letting the driver ride in a level position. The high rebound position is shown in FIG. 3. In the second step of the jolt, the truck cab will drop down below normal height and the seat quickly expands to fill up this suddenly added space below the seat cushion, letting the driver continue to ride in a smooth level position.

FIGS. 7, 8, 9, 10 and 11 show the torsion spring and torque tube structure and the means by which a driver can quickly adjust the spring mechanism to suspend the static weight of the driver in the halfway position.

The principal parts of the structure can best be seen in the exploded view of FIG. 12.

The seat assembly 10 consists of the back cushion 11, seat cushion 12, and metal frame 13. If desired, a back adjustment mechanism 14, which forms no part of the present invention, may be employed. Torsion bar adjusting mechanism 15 is provided with an end pivot bearing 16 and a ratchet with handle 17. The seat frame is provided with an upper mounting frame 18, which is shown in detached relation in FIG. 12. The frame 18 has two bearings 18a for the rear attachment of the lower parallel bar 26 and torque tube support bushings 19 and the upper shock absorber bracket 20 which is atached to the bottom panel of the seat.

The upper parallel bar mechanism 21 includes a center panel 22 having a hole 23 for the shock absorber, a front tube 24, and a torque tube 25 at its rear. The lower parallel bar mechanism 26 consists of two side bars 27, a front tube 28, and a rear tube 29.

The lower mounting frame 30 consists of a rear platform 31 carrying the lower shock absorber bracket 32 and rubber stops 33. The frame has three sides 34 having front bearings 35 for the upper parallel bar assembly or panel 21 and front bearings 36 for the lower bar assembly 26. A mounting angle 37 is fixed to the sides 34 of frame 30 for supporting the frame on the slide members 38 which have their lower sections secured to the floor. Such assembly members permit sliding movement or fore-and-aft adjustment of the seat and such structure forms no part of the present invention. An adjustment lever 39 may be provided for moving the frame 30 forwardly or rearwardly.

The hydraulic shock absorber 40 is attached to the bracket 32 of the lower mounting frame 30, and at its top the shock absorber is attached to the bracket 20 on the seat panel.

As shown best in FIGS. 9, 10 and 11, the torsion bar 41 is supported on the left end by a retainer 42 held rigidly by a pin 43 and bosses 44 in the torgue tube 25, and at the right end by end pivot bearing 16. Near the end bearing, the torsion bar 41 is grasped by a yoke 45 which is also attached to an adjustment screw 46 by means of a barrel nut 47, as shown best in FIGS. 8 and 9.

If desired, the seat may be equipped with seat belts, as illustrated in FIG. 3. In the specific illustration given, a strong belt 48 is secured to the floor and to the rear of the seat frame, and a second belt 49 is connected to the frame and is employed to hold the driver in the seat.

Referring to FIGS. 1–4 inclusive, it will be noted that the parallel bars 21 and 26 extend from the forward portion of the mounting frame 30 and upwardly to the rear portion of the seat frame, while the hydraulic shock absorber extends from the rear portion of the mounting frame and upwardly at an inclination toward the forward part of the seat. The upper parallel bar or panel member 21, which is fixed to the torque tube 25, is cut away centrally to provide a slot 23 for receiving the hydraulic shock absorber. With this structure, a balanced support is provided for the seat in a very compact manner. The torsion bar is preloaded as above described to support the upper parallel panel member so as to maintain the driver in an intermediate position. The lower frame is provided with side walls which receive and guide the upper parallel panel when the same lowers or nests within the mounting frame.

While in the foregoing specification we have set out specific structure in considerable detail for the purpose of illustrating embodiments of our invention, it will be understood that such details may be varied widely by those skilled in the art without departing from the spirit of our invention.

What we claim is:

1. In combination with a seat frame and a base spaced from said seat frame, a pair of parallel bars extending from said base upwardly and rearwardly, said seat frame having its rear portion pivotally connected to said parallel bars, torsion spring means on the rear portion of said seat frame normally urging said seat frame to an intermediate position, and a hydraulic shock absorber pivotally secured at its lower end to a rear portion of said base and at its upper end to a forward portion of said seat frame, said shock absorber extending at an inclination opposed to that of said parallel bars.

2. The structure of claim 1 in which said base is provided with side walls and one of said parallel bars is in the form of a panel adapted to collapse within said side walls, said panel being slotted to receive said shock absorber.

3. The structure of claim 1 in which said torsion spring is housed within a torgue tube and manual means are provided for adjusting the tension of said torsion spring.

References Cited

UNITED STATES PATENTS

| | | | |
|---|---|---|---|
| 1,390,865 | 9/1921 | Bangle | 248—378 |
| 1,898,444 | 2/1933 | Hawkins | 297—308 |
| 2,558,928 | 7/1951 | Bryan | 248—401 |
| 2,953,191 | 9/1960 | Brendel | 248—399 |
| 2,986,199 | 5/1961 | Ferreira et al. | 248—399 |
| 3,109,621 | 11/1963 | Simons et al. | 248—399 |
| 3,211,411 | 10/1965 | Rood | 248—399 |
| 3,285,562 | 11/1966 | Langer | 248—399 |
| 3,298,654 | 1/1967 | Dome | 248—377 |
| 3,423,060 | 1/1969 | Fulling et al. | 248—399 |

FRANCIS K. ZUGEL, Primary Examiner

U.S. Cl. X.R.

248—373; 297—307